United States Patent [19]
Ozaki et al.

[11] Patent Number: 6,096,983
[45] Date of Patent: Aug. 1, 2000

[54] POWDER/CHIP WEIGHING/FEEDING APPARATUS

[75] Inventors: Masahide Ozaki; Shinichi Kojima, both of Toyama-ken, Japan

[73] Assignee: YKK Corporation, Tokyo, Japan

[21] Appl. No.: 09/177,360

[22] Filed: Oct. 23, 1998

[30] Foreign Application Priority Data

Oct. 28, 1997 [JP] Japan ..................... 9-333450

[51] Int. Cl.⁷ ................. G01G 13/00; G01G 19/00; G01G 13/04; B65B 1/30; B65B 43/42
[52] U.S. Cl. ................. 177/52; 177/145; 141/83; 141/103; 141/170; 141/172
[58] Field of Search ................. 177/145, 52, 56, 177/57; 141/103, 170, 172, 83, 168

[56] References Cited

U.S. PATENT DOCUMENTS

| | | | |
|---|---|---|---|
| 3,462,911 | 8/1969 | Schmidt | 141/83 |
| 5,004,093 | 4/1991 | Blezard | 141/170 |
| 5,072,797 | 12/1991 | Hughes | 177/145 |
| 5,092,414 | 3/1992 | Blezard | 177/52 |
| 5,740,843 | 4/1998 | Burkart | 141/83 |
| 5,835,982 | 11/1998 | Lanaro et al. | 177/145 |

FOREIGN PATENT DOCUMENTS

| | | |
|---|---|---|
| 0 408 822 | 1/1991 | European Pat. Off. . |
| 2 280 274 | 1/1995 | United Kingdom . |

*Primary Examiner*—Randy W. Gibson
*Attorney, Agent, or Firm*—Hill & Simpson

[57] ABSTRACT

A weighing/feeding apparatus for mixing two or more different types of powder/chip by respective given amounts and feeding a weighing vessel with the mixture efficiently with accuracy is provided. The apparatus includes a weighing/feeding section arranged between a transfer path for transferring empty weighing vessels and a delivery path for delivering weighing vessels loaded with the powder/chip, the weighing/feeding section being connected to a powder/grain feeding path, a-plurality of powder/chip feeding units being arranged along the feeding path and provided with respective conduits, a weighing unit carrying thereon the empty weighing vessel which is reciprocated along the feeding path to fill the empty weighing vessel with a predetermined amount of powder/chip of a plurality of desired types before returning to the weighing/feeding section and then the weighing vessel loaded with the powder/chip is delivered to the delivery path.

4 Claims, 7 Drawing Sheets

POWDER/CHIP WEIGHING/FEEDING APPARATUS

BACKGROUND OF THE INVENTION

1. Field of the Invention

This invention relates to an apparatus for weighing/feeding powder/chip and, more particularly, to an apparatus adapted to transferring empty weighing vessels, feeding them with the powder/chip of several different kinds and delivering the loaded weighing vessels successively.

2. Prior Art

As is disclosed in Japanese Patent Publication No. 1-22566, there is a known powder/chip weighing apparatus which is adapted to transfer an empty weighing vessel to a powder/chip feeding position by means of a conveyor, filling the weighing vessel with a given amount of powder/chip weighed and fed by a bipartite weighing section including a preliminary weighing section comprising first, second and third hoppers for feeding the material by a large volume, a medium volume and a minute volumes respectively and a precision weighing section and delivering the weighing vessel forwardly by means of the same conveyor.

While the above described known powder/chip weighing apparatus can weigh and delivery the powder/chip of one kind in a highly efficient way, it is not adapted to weighing and mixing two or more different types of powder/chip before delivering them. Therefore, there is a demand for a weighing apparatus adapted to mixing different types of powder/chip and weighing them in a highly accurate and efficient fashion.

Thus, it is an object of the present invention to provide a weighing/feeding apparatus for mixing two or more than two different types of powder/chip by respective given amounts and feeding a weighing vessel with the mixture at an enhanced level of weighing accuracy.

SUMMARY OF THE INVENTION

According to the invention, the above object is achieved by providing a powder/chip weighing/feeding apparatus comprising a weighing/feeding section arranged between a transfer path for transferring empty weighing vessels and a delivery path for delivering weighing vessels loaded with the powder/chip and adapted to feed each transferred empty weighing vessel with a predetermined amount of powder/chip and move the weighing vessel loaded with the powder/chip onto the delivery path. In the apparatus, the weighing/feeding section is connected to a feeding path of the powder/chip independent from the transfer path and the delivery path, a plurality of powder/chip feeding units are arranged along the feeding path and provided with respective conduits, a weighing unit carrying thereon the empty weighing vessel is reciprocated along the feeding path to fill the empty weighing vessel with the predetermined amount of powder/chip of two or more than two desired types and returns to the weighing/feeding section and then the weighing vessel loaded with the powder/chip is delivered to the delivery path.

Preferably, the transfer path for transferring the empty vessels is provided in the front half thereof with a transfer panel adapted to reciprocate and having a pair of arms for carrying the weighing vessel and a pushing means for pushing and moving the weighing vessel on the transfer panel from back, the arms having an opening through which the weighing unit is allowed to pass to be raised.

Still preferably, the weighing unit is arranged on a vertically and horizontally movable base plate.

Still preferably, each powder/chip filling unit is provided with a plurality of conduits so that different types of powder/chip may be fed selectively into the weighing vessel by predetermined respective amounts.

DETAILED DESCRIPTION OF THE PREFERRED EMBODIMENT

Now, the present invention will be described by referring to the accompanying drawings that illustrate a preferred embodiment of the invention.

Figure 1:
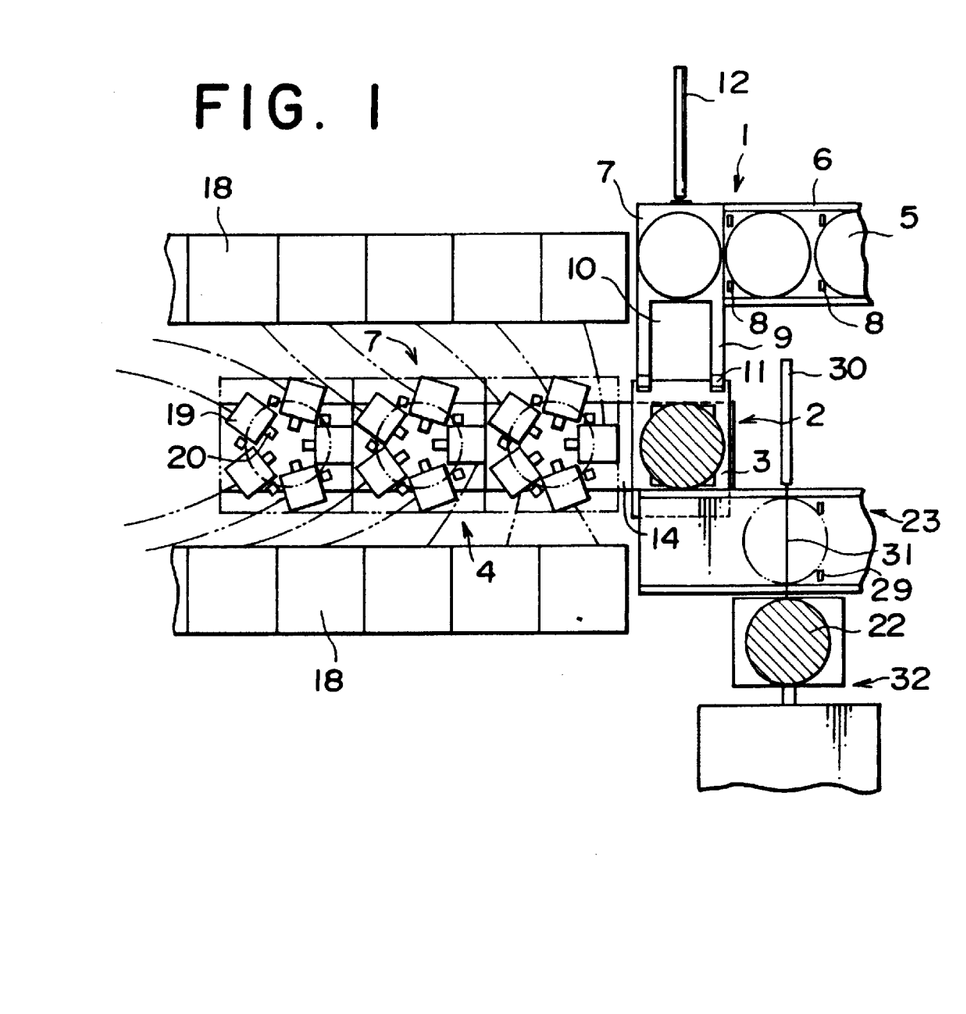
FIG. 1 is a schematic plan view of a powder/chip weighing/feeding apparatus according to the invention.
Figure 2:
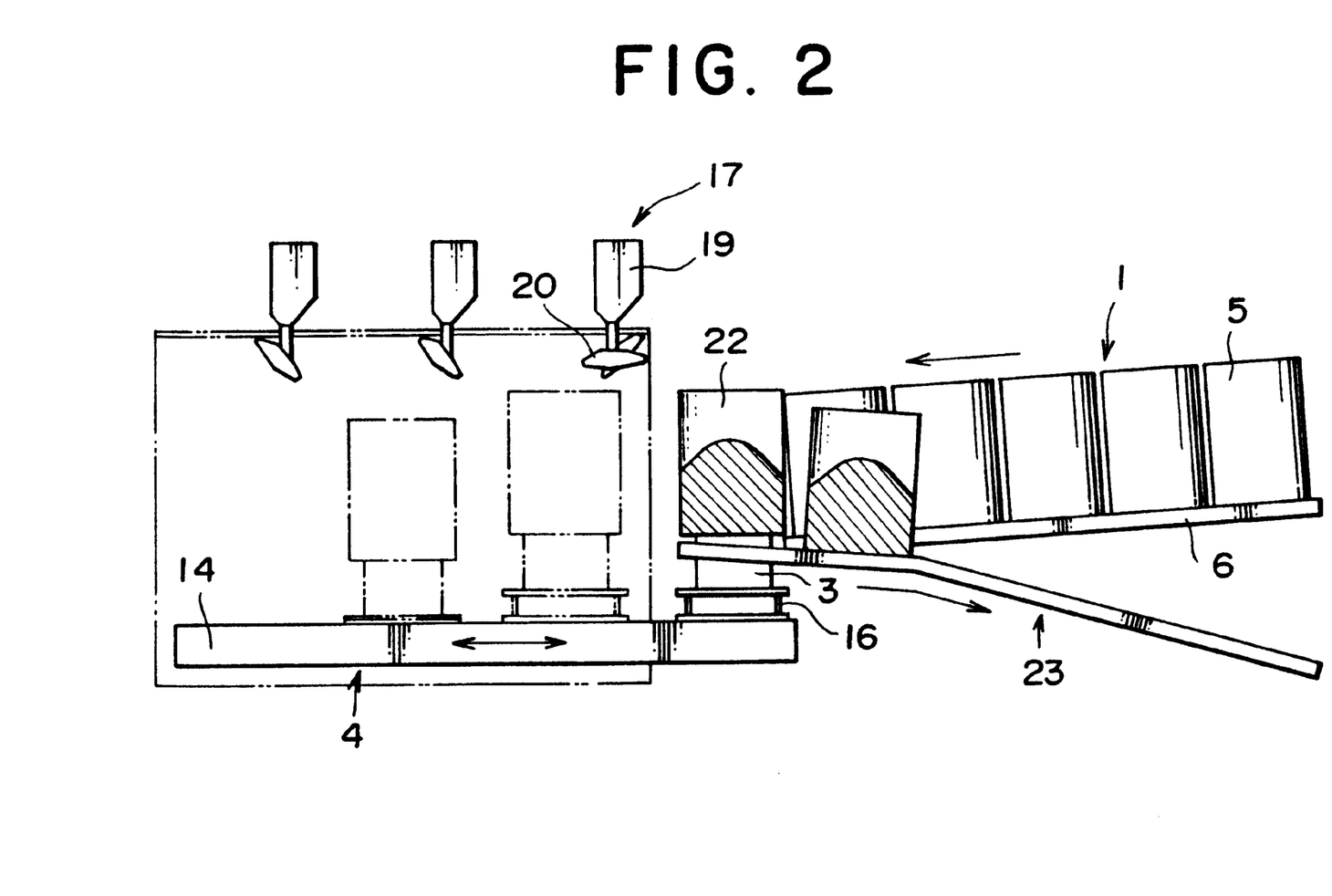
FIG. 2 is a schematic side view of the powder/chip weighing/feeding apparatus of FIG. 1.

FIGS. 1 and 2 respectively show a schematic plan view and a schematic side view of the embodiment of powder/chip weighing/feeding apparatus according to the invention.

The powder/chip weighing/feeding apparatus comprises a transfer path 1, a delivery path 23, a weighing/feeding section 2 arranged between the transfer path 1 and the delivery path 23 and a feeding path 4 for feeding empty weighing vessels 5 of the weighing/feeding section 2 with powder/grain.

The transfer path 1 is used to transfer the empty weighing vessels 5 to the weighing/feeding section 2 and includes an inclined portion 6 and a transfer panel 7 arranged perpendicularly to the inclined portion 6. The inclined portion 6 is provided on the surface thereof with a large number of rollers so that, as soon as the front most empty weighing vessel 5 is moved onto the transfer panel 7, the next empty weighing vessel 5 is automatically moved downward along the inclined surface by its own weight. In this way, empty weighing vessels 5 are automatically and sequentially supplied to the right position. Two sets of stoppers 8 are arranged at the front end of the inclined portion 6, as shown in FIG. 1. As the front set of stopper 8 is lowered, the front most empty weighing vessel 5 is moved onto the transfer panel 7 and the next empty weighing vessel 5 is halted by the rear stopper 8, which rear set of stopper 8 is lowered only when the leading empty weighing vessel 5 is completely moved onto the transfer panel 7. Then, the next empty weighing vessel 5 moves forward until it is halted by the front set of stopper 8 and held to a stand-by state. In this way, empty weighing vessels 5 are moved onto the transfer panel 7 from the front end of the inclined portion 6 on a one by one basis.

Figure 5:
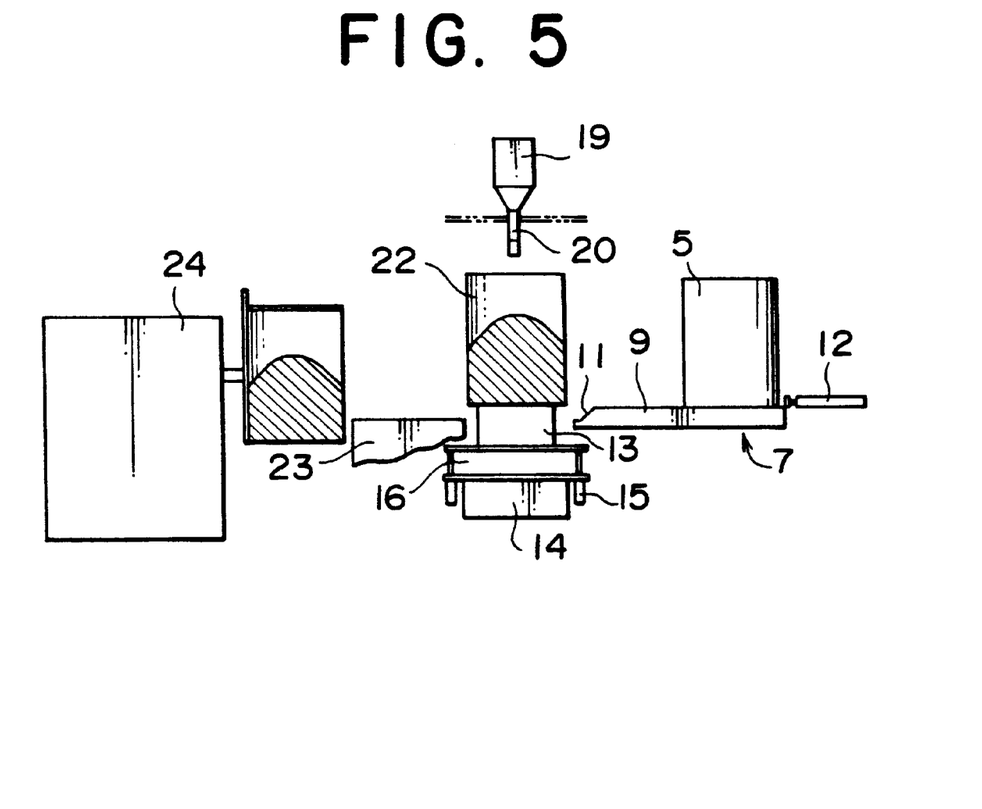
FIG. 5 is a schematic side view of the powder/chip weighing/feeding apparatus of FIG. 1, showing the arms of the transfer panel before being inserted under the weighing vessel that is loaded with powder/chip.

As seen from FIG. 1, the transfer panel 7 is disposed perpendicularly to the inclined portion 6 of the transfer path 1 and adapted to receive the empty weighing vessel 5 from the inclined portion 6 at a time and forward it to the weighing/feeding section 2. The transfer panel 7 is also adapted to carry two empty weighing vessels 5 and provided in the front half area thereof with a pair of forwardly projecting arms 9 so that one of the empty weighing vessels 5 is carried by the arms and can be lifted upward as a weighing unit 3 located therebelow is moved upward through a rectangular opening 10 defined by the pair of arms 9. As shown in FIG. 5, the arms 9 have respectively slopes 11 at the front ends thereof so that a loaded weighing vessel 22 that has been filled with the powder/chip may be moved onto the delivery path 23 with ease. A pushing cylinder unit 12 is arranged behind the transfer panel 7 and adapted to move toward the weighing/feeding section 2 with the transfer panel 7 and push the rear empty weighing vessels 5 on the transfer panel 7 by an action of a piston rod 13 so that the loaded weighing vessel 22 disposed forwards thereof on the transfer panel 7 that has been filled with the powder/chip may be moved onto the delivery path 23 to be discharged.

Figure 3:
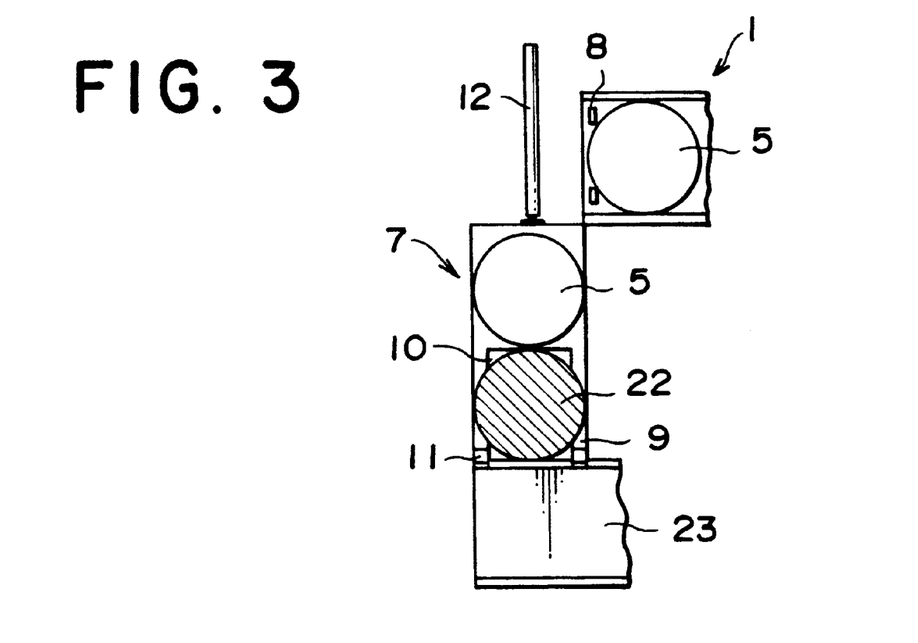
FIG. 3 is a schematic plan view of part of the powder/chip weighing/feeding apparatus of FIG. 1, showing that arms of a transfer panel are inserted under a weighing vessel.
Figure 4:
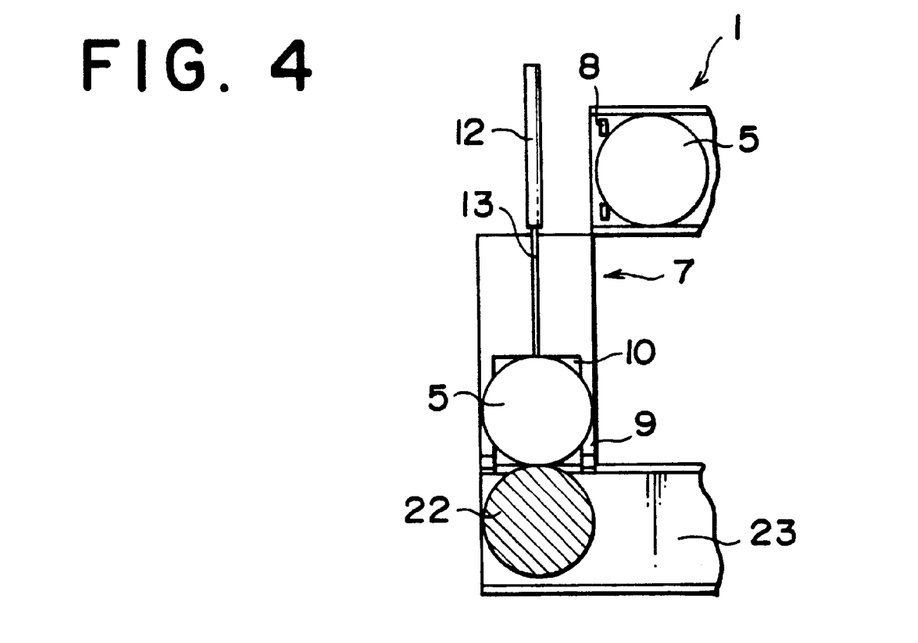
FIG. 4 is a schematic plan view similar to FIG. 3 but shows that an empty weighing vessel on the transfer panel is pushed to move out another weighing vessel that is loaded with the powder/chip.
Figure 6:
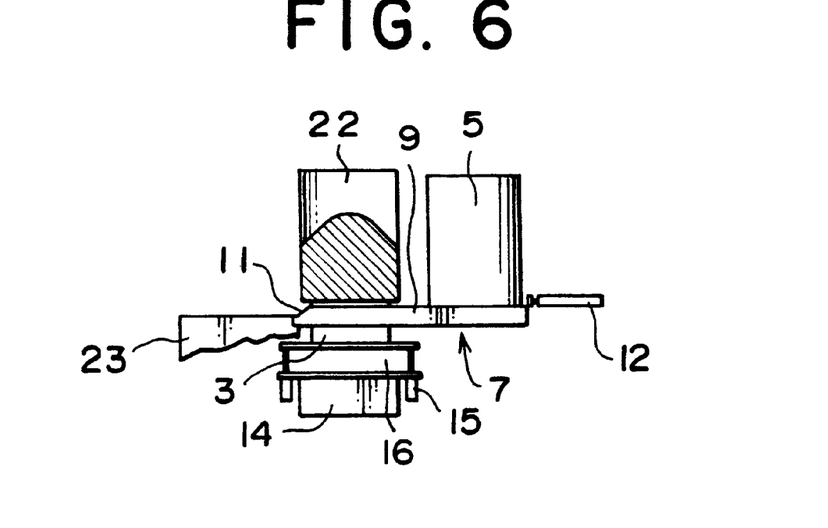
FIG. 6 is a schematic partial side view of the powder/chip weighing/feeding apparatus of FIG. 1, showing the arms of the transfer panel inserted under the weighing vessel that is loaded with the powder/chip.
Figure 7:
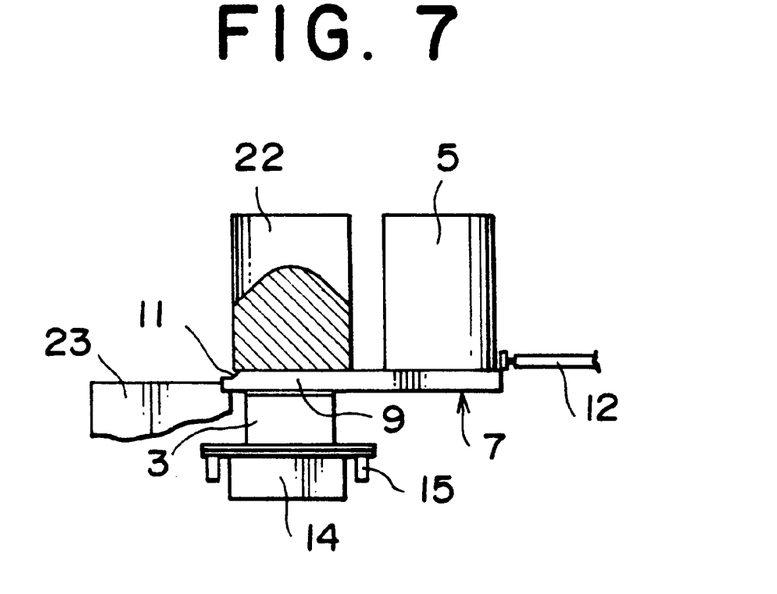
FIG. 7 is a schematic partial side view similar to FIG. 6 but shows that a base plate is lowered and the weighing vessel loaded with the powder/chip is carried by the arms.
Figure 8:
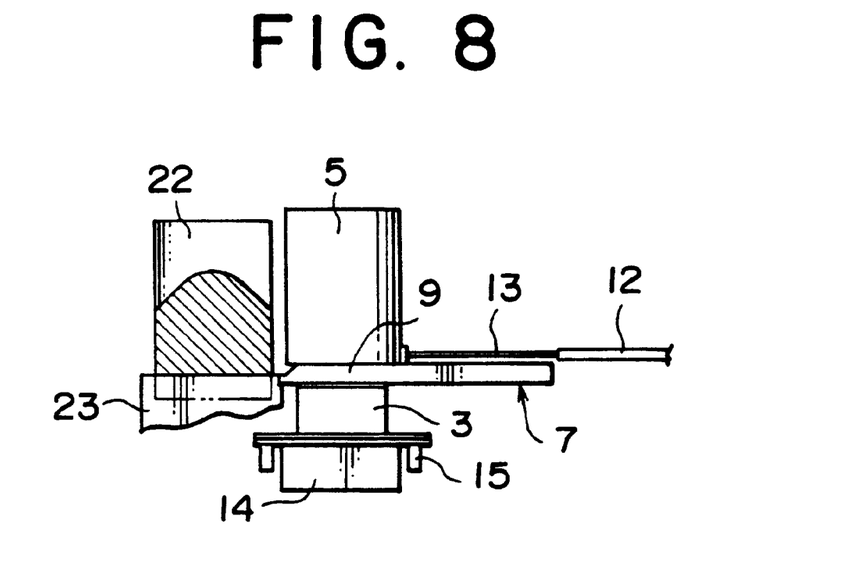
FIG. 8 is a schematic partial side view similar to FIG. 6 but shows that the weighing vessel loaded with the powder/chip has been pushed out onto a delivery path by the empty weighing vessel.

FIGS. 3 through 8 illustrate how the empty weighing vessel 5 is supplied onto the transfer panel 7 and the weighing vessel 22 that has been filled with the powder/chip is moved onto the delivery path 23. Firstly, the empty weighing vessel 5 is supplied to the weighing/feeding section 2 in a manner as described below. As the stopper 8 at the front end of the inclined portion 6 of the transfer path 1 are lowered, the front most empty weighing vessel 5 on the transfer path 1 moves onto the rear half area of the transfer panel 7 by its own weight to become carried by the transfer panel 7 as seen from FIG. 1. Then, the transfer panel 7 is moved to the weighing/feeding section 2 as shown in FIG. 3 and the arms 9 are inserted under the weighing vessel 22 that contains the powder/chip and is carried by a base plate 16 that has been pushed upward by a cylinder unit 15 as shown in FIG. 5. Subsequently, as shown in FIGS. 6 and 7, the base plate 16 is lowered so that the weighing vessel 22 containing the powder/chip is supported by the arms 9. Thereafter, as shown in FIGS. 4 and 8, the cylinder unit 12 located behind the transfer panel 7 is operated to push the rear empty weighing vessel 5 to be filled next from behind by means of the piston rod 13 of the cylinder 12 and move the front weighing vessel 22 containing the powder/chip onto the delivery path 23 and, at the same time, the rear empty weighing vessel 5 onto the arms 9. Then, the base plate 16 is lifted such that the weighing unit 3 on it is moved upward through the front opening 10 of the transfer panel 7 until the empty weighing vessel 5 is carried by the weighing unit 3 and the arms 9 moves away from the bottom of the empty weighing vessel 5, when the transfer panel 7 retreats to the position shown in FIG. 1. And the stopper 8 is lowered to let the leading empty weighing vessel 5 on the transfer path 1 move forward by its own weight to be held in a stand-by state at the front end of the transfer path 1 before it is moved onto the weighing/feeding section 2. In this way, empty weighing vessels are sequentially supplied and filled with the powder/chip and the loaded weighing vessels 22 are discharged on a one by one basis.

Figure 9:
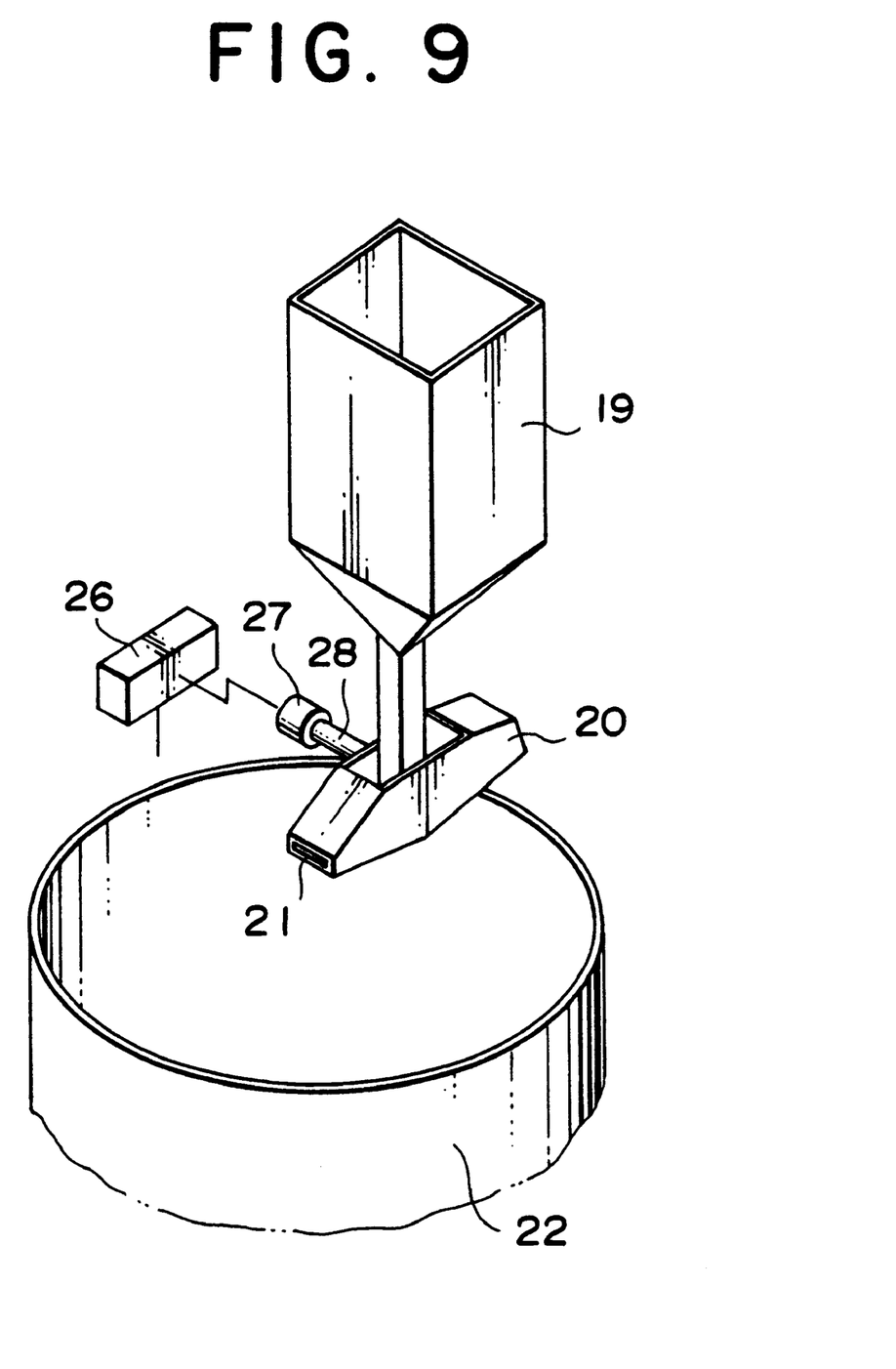
FIG. 9 is a schematic perspective view of one of the powder/chip feeding units of the powder/chip weighing/feeding apparatus of FIG. 1.
Figure 10:
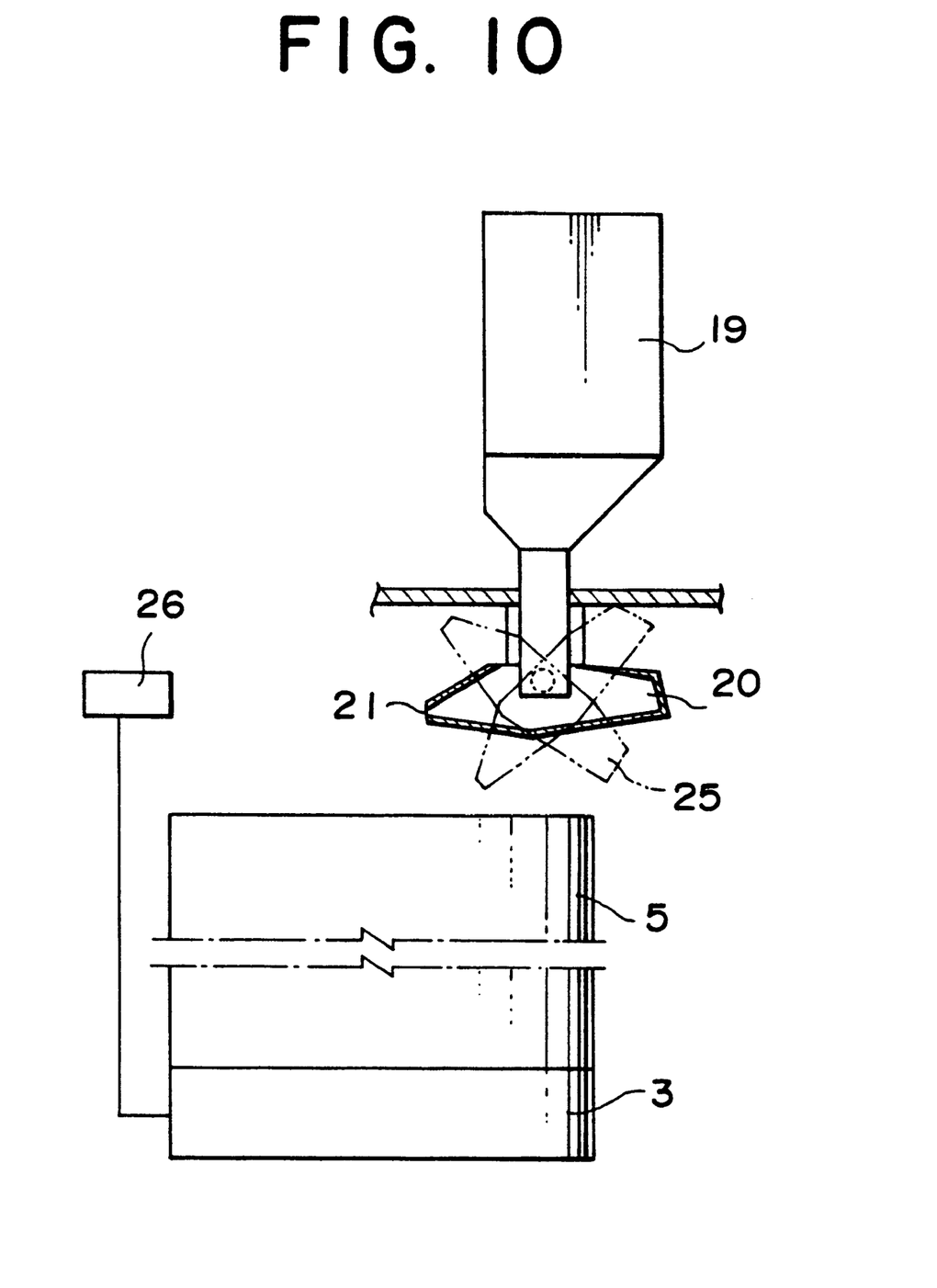
FIG. 10 is a schematic side view of the powder/chip feeding unit of FIG. 9.

Now, the function of the feeding path 4 where empty weighing vessels 5 are filled with the powder/chip will be described. As shown in FIG. 1, the feeding path 4 extends from the weighing/feeding section 2 arranged between the transfer path 1 and the delivery path 23 in a direction opposite to both the transfer path 1 and the delivery path 23, where there is provided are several powder/chip filling units 17. The feeding path 4 comprises a conveyor 14 or some other moving means and adapted to reciprocate the weighing unit 3 arranged on the base plate 16 with the base plate 16 adapted to move up and down. The several powder/chip filling units 17 for filling empty weighing vessels 5 with the powder/chip are arranged above and along the feeding path 4. Several storage tanks 18 for storing the powder/chip are arranged at the opposite sides of the feeding path 4 as shown in FIG. 1 to feed the powder/chip filling units 17 with the powder/chip. The storage tanks 18 respectively contain the powder/chip of different types, which may be fine plastic chips of different colors, and are adapted to feed them to respective storage portions 19 of each of the filling units 17. Referring to FIGS. 9 and 10, in the case of the illustrated embodiment, each of the powder/chip filling units 17 can fill the empty weighing vessel 5 with up to five different types of powder/chip as is equipped with five sets of filling means, each including the storage portions 19 and a conduit 20, although only one storage portions 19 and one conduit 20 are shown for the purpose of simplification. Thus, the filling means of the powder/chip filling unit 17 includes the storage portion 19 and the conduit 20, the storage portion 19 being located above the conduit 20. As shown in FIGS. 9 and 10, the powder/chip is fed to the conduit 20 from the storage portion 19 located thereabove and the conduit 20 is tilted to take a posture as indicated by broken lines in FIG. 10, where a discharge port 21 of the conduit 20 is facing downward so that the powder/chip in the conduit 20 may fall into the empty weighing vessel 5 located therebelow. A predetermined amount of powder/chip is fed to the weighing vessel 5 typically in three stages in a highly efficient and precise fashion, a relatively large volume of powder/chip being dumped into the weighing vessel 5 in the first stage by tilting the conduit 20 by a large angle of inclination, a medium volume of powder/chip being made to fall into the weighing vessel 5 in the second stage by tilting the conduit 20 by a slightly increased angle of inclination, the balance or a minute volume of powder/chip being made to fall into the weighing vessel 5 in the last stage by vertically reciprocating the discharge port 21 by a minute angle of inclination. As the predetermined volume of powder/chip is received by the weighing vessel 5 as measured by the weighing unit 3 disposed below in each stage, a processing unit 26 issues a command signal to a motor 27 to turn a rotary shaft 28 of the conduit 20 reversely and move the conduit 20 to the reference position 25 indicated by broken lines in FIG. 10 before turning the rotary shaft 28 forwardly to realize the angle of inclination of the next stage of operation and feed the vessel 5 with the predetermined amount of powder/chip. In the final stage of operation, the discharge port 21 of the conduit 20 is reciprocated by a minute angle so that the predetermined minute amount of powder/chip may reliably fall into the weighing vessel 5 as being weighed. A total of five filling means, each including the storage portion 19 and the conduit 20, are arranged for each single filling unit 17 as shown in FIG. 1 so that a predetermined amount of powder/chip is fed to each weighing vessel 5 by way of the filling means containing desired types of powder/chip according to a command signal. The weighing vessel 5 carried by the weighing unit 3 is moved to a position right below the filling unit 17 having filling means that store the powder/chip of the desired type, by means of the conveyor 14 as shown in FIG. 2, where the base plate 16 is raised to make the weighing vessel 5 on the weighing unit 3 come close to the filling unit 17 and then the weighing vessel 5 is filled with a predetermined amount of powder/chip of a desired type. Then, the base plate 16 is lowered and moved to a position right below the next filling unit 17 for the next desired type of powder/chip, where the base plate 16 is raised once again to make the weighing vessel 5 on the weighing unit 3 to be filled with a predetermined amount of powder/chip of another desired type. Then, the base plate 16 is lowered again and moved back to a position right below the next filling unit 17 for the next desired type of powder/chip and so on until it returns to the shaded position in FIG. 1. Before returning, the base plate 16 is raised once again so that the arms 9 of the transfer panel 7 may be inserted below the weighing vessel 22 filled with the powder/chip as shown in FIG. 2. As the arms are inserted under the bottom of the weighing vessel 22 containing the powder/chip as shown in FIG. 6, the base plate 16 is lowered so that the weighing vessel 22 containing the powder/chip is carried by the arms 9 as shown in FIG. 7 and pushed onto the delivery path 2 by the immediately following empty weighing vessel 5 as shown in FIG. 8.

It may be appreciated that the filling unit 17 located closest to the weighing/feeding section 2 for supplying empty weighing vessels 5 is preferably used to feed the powder/chip of the most frequently used type from the viewpoint of efficiency.

As shown in FIG. 2, the delivery path 23 has a slope so that the weighing vessel 22 containing the powder/chip may come down by its own weight and by means of rollers arranged on the surface of the delivery path 23 until it is halted by a set of stopper 29 arranged at the front end of the delivery path 23. Then, as shown in FIG. 1, it is pushed sideways onto a tumbler mixer portion 32 by a piston rod 31 driven by a cylinder 30 arranged at a side of the delivery path 23 and the powder/chip contained in the weighing vessel 22 is turned and mixed uniformly before it is moved to the next station.

Thus, in the powder/chip weighing/feeding apparatus according to the invention, the empty weighing vessels 5 are supplied from the transfer path 1 to the weighing/feeding section 2, where each weighing vessel 5 is filled with the predetermined amount of powder/chip of desired types and the weighing vessel 22 containing the powder/chip is delivered to the delivery path 23. Thus, each weighing vessel 22 is filled with the predetermined amount of mixed powder/chip of desired types automatically, reliably and efficiently with high precision.

As described above, according to the invention, there is provided the powder/chip weighing/feeding apparatus including a weighing/feeding section 2 arranged between the transfer path 1 for transferring the weighing vessels 5 and the delivery path 23 for delivering the weighing vessels 22 loaded with the powder/chip, the weighing/feeding section 2 being connected to a powder/chip feeding path 4 independent from the transfer path 1 and the delivery path 23, the plurality of powder/chip feeding units 17 being arranged along the feeding path 4 and provided with respective conduits 20, a weighing unit 3 carrying thereon the empty weighing vessel 5 being reciprocated along the feeding path 4 to fill the empty weighing vessel 5 with the predetermined amount of powder/chip of two or more desired types before returning it to the weighing/feeding section 2 and then delivering the weighing vessel 22 loaded with the powder/chip to the delivery path 23. With this arrangement, the weighing vessels 22 containing the predetermined amount of the mixture of the desired types of powder/chip can be obtained successively, automatically and efficiently, with high precision. Additionally, the steps of transferring the empty weighing vessels 5, filling each empty weighing vessel 5 with the powder/chip of different types and delivering filled weighing vessels 22 are carried out continuously on a single apparatus to reduce the space required to install the apparatus.

As the transfer path 1 for transferring empty vessels 5 is provided in the front half thereof with the transfer panel 7 adapted to reciprocate and having the pair of arms 9 for carrying the weighing vessel 5 and the pushing means for pushing and moving the weighing vessel on the transfer panel 7 from back, the arms 9 having the opening 10 through which the weighing unit 3 is allowed to pass to be raised, each empty weighing vessel 5 can be moved from the transfer path 1 to the weighing/feeding section 2 smoothly and easily and the operation of delivering the filled weighing vessel 22 and that of feeding the empty weighing vessel 5 can be carried out concurrently to further improve the efficiency of operation.

Additionally, as the weighing unit 3 is arranged on a vertically and horizontally movable base plate 16, each empty weighing vessel 5 can be moved close to the target filling unit 17 and filled with the powder/chip of the desired type in a simple and reliable fashion.

And as each powder/chip filling unit 17 is provided with a plurality of conduits 20 so that desired types of powder/chip may be fed into the weighing vessel 5 by predetermined respective amounts, a single apparatus can be used to selectively fill weighing vessels 5 with the powder/chip of various different types.

What is claimed is:

1. A powder/chip weighing/feeding apparatus comprising a weighing/feeding section arranged between a transfer path for transferring empty weighing vessels and a delivery path for delivering weighing vessels loaded with the powder/chip and adapted to feed each transferred empty weighing vessel with a predetermined amount of powder/chip and move the weighing vessel loaded with the powder/chip onto the delivery path,
   wherein said weighing/feeding section is connected to a feeding path of the powder/chip independent from the transfer path and the delivery path, a plurality of powder/chip feeding units are arranged along the feeding path and provided with respective conduits, and a weighing unit carrying thereon the empty weighing vessel is reciprocated along the feeding path to fill the empty weighing vessel with the predetermined amount of powder/chip of two or more than two desired types and returns to the weighing/feeding section and then the weighing vessel loaded with the powder/chip is delivered to the delivery path.

2. A powder/chip weighing/feeding apparatus according to claim 1, wherein the transfer path for transferring the empty vessels is provided in the front half thereof with a transfer panel adapted to reciprocate and having a pair of arms for carrying the weighing vessel and a pushing means for pushing and moving the weighing vessel on the transfer panel from back, said arms having an opening through which the weighing unit is allowed to pass to be raised.

3. A powder/chip weighing/feeding apparatus according to claim 1 or 2, wherein the weighing unit is arranged on a vertically and horizontally movable base plate.

4. A powder/chip weighing/feeding apparatus according to claim 1, 2 or 3, wherein each powder/chip filling unit is provided with a plurality of conduits so that different types of powder/chip may be fed selectively into the weighing vessel by predetermined respective amounts.

* * * * *